(12) United States Patent
Bergman et al.

(10) Patent No.: US 8,655,800 B2
(45) Date of Patent: Feb. 18, 2014

(54) DISTANCE BASED VISUALIZATION OF EVENT SEQUENCES

(75) Inventors: Ruth Bergman, Haifa (IL); Michal Aharon, Haifa (IL); Tsahi Rosenbaom, Rishon le zion (IL); Ram Arad, Nez-Ziona (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 13/123,095

(22) PCT Filed: Oct. 7, 2008

(86) PCT No.: PCT/US2008/079058
§ 371 (c)(1),
(2), (4) Date: Apr. 7, 2011

(87) PCT Pub. No.: WO2010/042112
PCT Pub. Date: Apr. 15, 2010

(65) Prior Publication Data
US 2011/0202483 A1    Aug. 18, 2011

(51) Int. Cl.
*G06F 17/00* (2006.01)
*G06F 15/173* (2006.01)
*G06F 3/00* (2006.01)
*G06N 5/04* (2006.01)
*H04L 29/08* (2006.01)
*G06F 3/0481* (2013.01)

(52) U.S. Cl.
CPC ............ *G06N 5/04* (2013.01); *H04L 29/08072* (2013.01); *G06F 3/0481* (2013.01)
USPC .............................. 706/11; 709/224; 715/700

(58) Field of Classification Search
None
See application file for complete search history.

(56) References Cited

U.S. PATENT DOCUMENTS

| | | | |
|---|---|---|---|
| 6,968,341 B2 | 11/2005 | Hand et al. | |
| 7,170,418 B2 * | 1/2007 | Rose-Pehrsson et al. | 340/628 |
| 7,293,019 B2 | 11/2007 | Dumais | |
| 7,406,199 B2 | 7/2008 | Lindeman | |
| 8,005,767 B1 * | 8/2011 | Cassella | 706/12 |
| 2002/0073195 A1 * | 6/2002 | Hellerstein et al. | 709/224 |
| 2003/0009470 A1 * | 1/2003 | Leary | 707/100 |
| 2006/0287831 A1 * | 12/2006 | Totiba et al. | 702/19 |
| 2006/0288037 A1 | 12/2006 | Sundararajan | |
| 2008/0126858 A1 * | 5/2008 | Barras | 714/25 |

FOREIGN PATENT DOCUMENTS

CN    1664819 A    9/2005
WO  PCT/US2008/076949    10/2008

OTHER PUBLICATIONS

Schmidt, D.C., Scalable High-Performance Event Filtering for Dynamic Multi-point Applications, Proceedings 1st Workshop on High Performance Protocol Architectures (HIPPARCH), INRIA, Sophia Antipolis, France, Dec. 1994, p. 1-8.

(Continued)

*Primary Examiner* — Alan Chen (57) ABSTRACT

Event analysis methods and apparatus in which sequences (44, 46) of one or more events are identified based on event records (20) describing the events. Respective distance values (28) representing distances between ones of the sequences (44, 46) are determined. A configuration of points in a target metric space is constructed based on the distance values (28), where each of the points represents a respective one of the sequences (44, 46). A visual representation (38) of the configuration is presented on a display (34).

15 Claims, 5 Drawing Sheets

(56) References Cited

OTHER PUBLICATIONS

Roesch, M., Snort: Lightweight Intrusion Detection for Networks, In Proceedings of the 13th conference on System Administration, pp. 229-238 USENIX Association, 1999.

Paxson, V., Bro: a system for detecting network intruders in real-time, Journal of Comput. Networks, vol. 31, No. 23-24, pp. 2435-2463, 1999.

S.W.Malone, P. Tarazaga and M.W. Trosset. Optimal dilations for metric multidimensional scaling. In Proceedings of the Statistical Computing Section 2000.

L. Lee, Measures of distributional similarity, Proceedings of the 37th annual meeting of the Association for Computational Linguistics on Computational Linguistics, p. 25-32, Jun. 20-26, 1999, College Park, Maryland.

Thompson JD, Higgins DG, Gibson TJ. (1994). CLUSTAL W: improving the sensitivity of progressive multiple sequence alignment through sequence weighting, positions-specific gap penalties and weight matrix choice. Nucleic Acids Res 22:4673-4680.

H. Klock and J.M. Buhmann. Data visualization by multidimensional scaling: A deterministic annealing approach. Technical Report IAI-TR-98-8, Universitat Bonn, Institut fur Informatik III, Romerstrasse 194, Oct. 28, 1998.

JD Thompson et al., "BAliBASE: a benchmark alignment database for the evaluation of multiple alignment programs," Bioinformatics Applications Note, vol. 15, No. 1, pp. 87-88, 1999.

Needleman, S. and Wunsch, C, A general method applicable to the search for similarities in the amino acid sequence of two proteins, J Mol Biol. 48(3):443-53, 1970.

\* cited by examiner

FIG. 8 ic # DISTANCE BASED VISUALIZATION OF EVENT SEQUENCES

BACKGROUND OF THE INVENTION

Virtually all complex systems, from telecommunications networks to office printers, include event monitors that generate streams of events (e.g., information messages, warnings and error messages) that provide information that can be used to service the systems. Depending on the type and size of the system, hundreds or even millions of events may be generated on a typical day. The process of sorting through such a large number of events is onerous and impedes the ability of operators to identify failures and repair the system. For this reason, many systems include automated event filtering systems that attempt to filter out un-informative events in order to reduce the number of events that are presented to the user. Event filtering rules typically are written and validated by an expert in the domain of a target system based primarily on his or her knowledge of the system being monitored. This process typically involves a substantial amount of trial and error.

What are needed are systems and methods for assisting domain experts and other users in the development of event filtering rules.

BRIEF SUMMARY OF THE INVENTION

In one aspect, the invention features a method in accordance with which sequences of one or more events are identified based on event records describing the events. Respective distance values representing distances between ones of the sequences are determined. A configuration of points in a target metric space is constructed based on the distance values, wherein each of the points represents a respective one of the sequences. A visual representation of the configuration is presented on a display.

The invention also features apparatus operable to implement the inventive method described above and computer-readable media storing computer-readable instructions causing a computer to implement the inventive method described above.

Other features and advantages of the invention will become apparent from the following description, including the drawings and the claims.

DETAILED DESCRIPTION OF THE INVENTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described herein provide event analysis systems and methods that enable domain experts and other users to analyze event streams and develop event filtering rules. Some embodiments discover significant sequences of events within an event stream and provide tools for visualizing, analyzing, and generalizing the discovered sequences. In some of these embodiments, the event sequences are visualized on a display as a two-dimensional configuration of points in which similar sequences are represented by points that are grouped closer together and unrelated sequences are represented by points that are spaced farther apart. Such visualization allows users to easily spot frequently occurring scenarios and enables them to easily segregate important events from unimportant events for a given scenario. In this way, these embodiments give users insights into event data that they can use to define rules that filter out events. Some embodiments provide tools for distilling event streams into event filtering rules and tools for validating those event filtering rules.

II. Analyzing Events

A. Introduction

Figure 1:
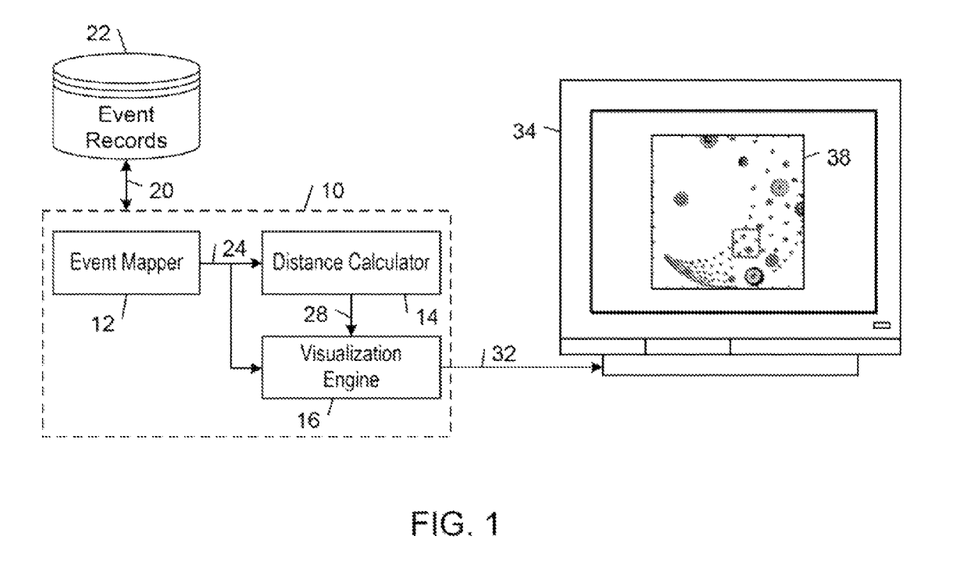
FIG. 1 is a block diagram of an embodiment of an event analysis system.

FIG. 1 shows an embodiment of an event analysis system 10 that includes an event mapper 12, a distance calculator 14, and a visualization engine 16.

Figure 2:
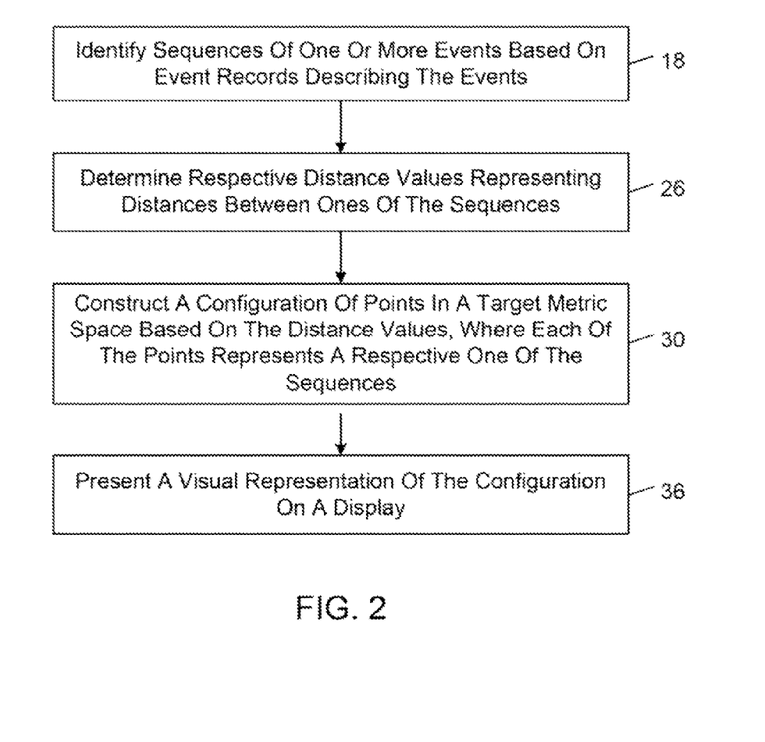
FIG. 2 is a flow diagram of an embodiment of an event analysis method.

FIG. 2 shows an embodiment of an event analysis method that is implemented by the event analysis system 10.

In accordance with the method of FIG. 2, the event mapper 12 identifies sequences of one or more events based on event records 20 that describe those events (FIG. 2, block 18). In this process, the event mapper 12 identifies sequences of related events. The event mapper 12 generates an output 24 that defines the identified sequences of related events. In the illustrated embodiment, the output 24 is passed to the distance calculator 14 and the visualization engine 16. In other embodiments, the output 24 is stored in a database 22 in the form of a table or other data structure that can be accessed by the distance calculator 14 and the visualization engine 16.

The distance calculator 14 determines respective distance values that represent distances between ones of the sequences 24 (FIG. 2, block 26). In general, the distance metric that is used to calculate the distance values may correspond to one or more of a wide variety of different distance metrics. Exemplary distance metrics that are used in embodiments of the distance calculator 14 to calculate the distance values are described in detail below. The distance calculator 14 transmits to the visualization engine 16 an output 28 that contains the calculated distance values.

The visualization engine 16 constructs a configuration of points in a target metric space based on the distance values 28 (FIG. 2, block 30). Each of the points in the configuration represents a respective one of the sequences of events and the constituent events in each sequence correspond to attributes of the respective point. The target metric space typically is a p-dimensional Euclidean space, where p is an integer value greater than one. In the illustrated embodiment, the target metric space is a two-dimensional Euclidean space. The visualization engine 16 translates proximities or dissimilarities between pairs of the sequences into a global structure in the target metric space, where the Euclidean distances between points in the global structure reflect the dissimilarities between pairs of sequences. In this way, similar sequences are grouped closer together and unrelated sequences are spaced farther apart. The visualization engine 16 generates an output 32 that defines the point configuration.

Based on the output 32 generated by the visualization engine 16, a visual representation of the configuration is presented on a display 34 (FIG. 2, block 36). In the illustrated embodiment, the target metric space corresponds to a two-dimensional Euclidean space (i.e., p=2) and the configuration is visualized as a two-dimensional image 38 on the display 34. In this embodiment, different sizes and shading of the points in the image 38 represent different numbers of occurrences of the same sequence of events. In the image 38, the relative spacings between the points reflect the levels of dissimilarity between the points. Thus, the points corresponding to similar event sequences are spaced closer to one another and the points corresponding dissimilar event sequences are spaced farther apart from one another. Such visualization allows users to easily spot frequently occurring scenarios and enables them to easily segregate important events from unimportant events for a given scenario. In this way, these embodiments give users insights into event data that they can use to define rules that filter out events, as described in detail below.

B. Associating Events with Points

As explained above, the event mapper 12 identifies sequences of one or more events based on event records 20 that describe those events (FIG. 2, block 18).

In this process, event records 20 are input into the event mapper 12. In the illustrated embodiment, the event mapper 12 receives the event records 20 from the database 22, which may be a local or remote database. In other embodiments, the event mapper 12 may receive the event records 20 from another source (e.g., directly from an event generation component of a target system that originally generated the event records 20).

The event records 20 typically correspond to messages that are generated by an event generation component of a target system (e.g., a telecommunications network or a printing press) and written to a log file. In some embodiments, each of the event records 20 typically includes header fields (e.g., time stamps, source/destination addresses, routing identifiers, priority levels) and payload data that typically includes a data (e.g., event codes and other parameter values) that describes the nature of the event that triggered the generation of the event record. In some embodiments, the event records 20 are processed by an extract, transfer, and load (ETL) application, which processes the event log files (e.g., by performing conventional warehousing functions, such as data cleaning), formats the processed event data into a predefined record format, and loads the resulting event records 20 into the database 22.

The event mapper 12 processes the event records 20 to identify sequences of related events (e.g., events that refer to the same physical phenomenon or problem). In some embodiments, the event records 20 typically correspond to respective sequences (or cascades) of events that are ordered by parameter values (e.g., temporal parameter values, such as timestamp values, or other parameter values, such as sequence number values) that are associated with the events. In these embodiments, the event mapper 12 parses the event records 20 for sequencing information (e.g., time stamp data or sequence number data) and the payload data that describes the corresponding events. The event mapper 12 then identifies the event sequences based on one or more domain-specific sequence definitions. Exemplary sequence definitions typically include at least one opening condition that defines a beginning of an event sequence and at least one closing condition that defines an ending of an event sequence. Opening and closing conditions typically are determined after extensive testing and validation of opening and closing definitions that are proposed based on domain-specific knowledge of the system being monitored. In one exemplary embodiment, the following opening and closing conditions have been defined for an embodiment of the INDIGO® digital printing press available from Hewlett-Packard Company of Palo Alto, Calif., USA.

Open sequence condition:
An event that occurred while the press was printing, and will cause the press to stop printing in the immediate time frame (machine state=PRINT_STATE and event urgency=ERRURG_IMMEDIATELY or ERRURG_SEPERATION).

Close sequence conditions:
n seconds after a PRINT_JOB_INTERRUPT event (typically n=2).
A change in the machine state from the PRINT_STATE to a non-printing state.
k impressions have printed since the sequence eras opened (typically k=7).
y seconds have elapsed since the sequence was opened (typically y=15).
A new job started printing, i.e. a PRINT_JOB_START event occurs.

Figure 3:
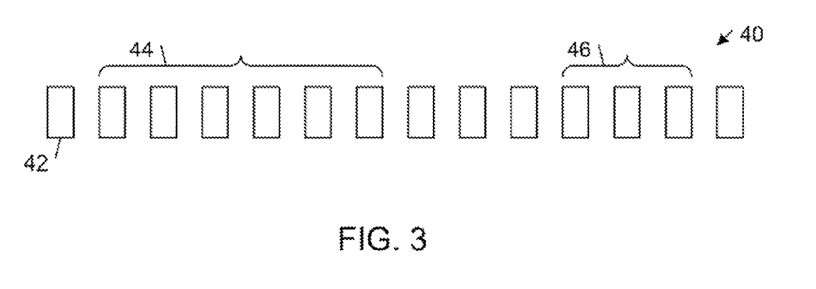
FIG. 3 is a diagrammatic view of an exemplary event stream in which two event sequences have been identified.

The event mapper 12 identifies the event sequences by applying the opening and closing conditions to the parsed event record data. FIG. 3 shows an exemplary stream 40 of events 42 in which two event sequences 44, 46 have been identified. In some embodiments, the event mapper 12 generates a data structure (e.g., a table) that associates the event records 20 with respective ones of the identified sequences.

C. Determining Distances

1. Introduction

As explained above, the distance calculator 14 determines respective distance values that represent distances between ones of the points 24 (FIG. 2, block 26).

In general, the distance metric that is used to calculate the distance values may correspond to one or more of a wide variety of different distance metrics. In some embodiments, the distance metric reflects the intrinsic difference between the constituent events of the points. In some of these embodiments, the distance metric produces larger distance values for event sequences that reflect different problems in the system being monitored, and produces lower (e.g., very low, or even zero) values between event sequences that reflect the same problem. The process of defining the distance metric typically depends on detailed knowledge of the system being monitored.

A variety of different distance metrics may be used to calculate the distances 28, including but not limited to the following distance metrics and their variations:
an Ordered Distance Metric
a cosine distance metric (e.g., the Unordered Distance Metric)
Partial Order Distance Metric
the Jaccard distance metric
These distance metrics may be used either alone or in combination.

2. Ordered Distance Metric

The ordered distance metric (also referred to as the "edit distance") measures the distance between event sequences based on a determined cost of converting one sequence into the other by substituting events, deleting events, and inserting events, where the cost of each operation may be weighted differently depending on one or more parameters associated with the events (e.g., event type).

In some embodiments, the ordered distance metric between a pair of event sequences s1 and s2 is defined as the minimum number of point mutations that are required to change s1 into s2, where a point mutation is one of: (1) change an event; (2) insert an event; or (3) delete an event. The ordered distance metric may be calculated in a variety of different ways.

In some embodiments, the ordered distance metric is calculated based on the dynamic programming method described in the web site www.csse.monash.edu.au/~lloyd/tildeAlgDS/Dynamic/Edit/. In accordance with this method, the following recurrence relations define the ordered distance, d(s1,s2), between the strings s1 and s2:

$$d('','')=0$$

$$d(s,'')=d('',s)=|s|$$

$$d(s1+ch1,s2+ch2)=\min(d(s1,s2)+\text{cost\_subst}(e1,e2), d(s1+e1,s2)+\text{cost\_delete}(e1), d(s1,s2+e2)+\text{cost\_insert}(e2))$$

where '' represents an empty sequence, |s| represents the length of the sequence (number of events), e1 is the last event of s1, and e2 is the last event of s2. The cost functions cost_subst(e1,e2), cost_delete(e1), and cost_insert(e2) are defined based on the particular system being monitored.

In some embodiments, the cost functions are defined as follows:

$$\text{cost\_subst}(e1,e2)=0 \text{ if } e1=e2 \text{ else } 1$$

$$\text{cost\_delete}(e1)=1 \text{ for all } e1!=''$$

$$\text{cost\_insert}(e1)=1 \text{ for all } e1!=''$$

In the embodiment of the INDIGO® digital printing press mentioned above, one or more of these cost functions depend on whether the event is reported to the operator. For example, in some of these embodiments, the cost functions are defined as follows:

$$\text{cost\_subst}(e1,e2)=0 \text{ if } e1=e2 \text{ else } 1$$

$$\text{cost\_delete}(e1)=1 \text{ if } e1 \text{ is reported, 0 otherwise}$$

$$\text{cost\_insert}(e1)=1 e1 \text{ is reported, 0 otherwise}$$

In other embodiments, the ordered distance metric is calculated is based on the Wagner-Fischer algorithm for edit distance (see, e.g., http://en.wikipedia.org/wiki/Levenshtein_distance).

3. Unordered Distance Metric

The unordered distance metric is a variation of the cosine distance metric, which measures the distance between event sequences based on the (typically weighted) number of similar events in the sequences in relation to the number of different events. In this process, a level of similarity between leading ones of the events in respective pairs of event sequences is determined.

In some embodiments, the unordered distance metric is calculated as follows. Given event sequences $I=[i_1, i_2, \ldots i_k]$ and $J=[j_1, j_2, \ldots, j_l]$, and a set of weights that are respectively assigned to the events, the unordered distance between the event sequences is calculated as follows:

If $(I \cap J) = \{\}$ then Distance=maximal distance

Else, Distance=sum of weights $((I \cap J)/(I \cup J))$ divided by: sum of weights $((I \cup J))$.

If Distance=0, set: Distance=minimal distance.

where $(I \cap J)$ is the intersection between sets I and J, $(I \cup J)$ is the union of sets I and J. and A/B is defined as all elements in the set A that are not included in the set B. The weights may be default weights or they may be set by the user. In the embodiment of the INDIGO® digital printing press mentioned above, the weights are automatically set based on whether or not the events are "reported" or "unreported" events, where reported events are events that are reported to the user by the event generation component of the target system and unreported events are events that are not reported to the user by the event generation component of the target system. The maximal and minimal distances typically are constant values corresponding to the extrema of a specified range of distance values. For example, in some exemplary embodiments the maximal distance is 999999 and the minimal distance is 0.001.

4. Partial Order Distance Metric

The partial order distance metric measures the distance between event sequences based primarily on the one or more of the leading events in the sequences (e.g. by giving one or more of the leading events in the sequences higher importance than the other events in the sequences).

In the embodiment of the INDIGO® digital printing press mentioned above, the partial order distance refers to the first reported event in each sequence. If the first reported events are similar, the partial order distance is set to a small value, otherwise it is set to a large value. In particular, given event sequences $I=[i_1, i_2, \ldots i_k]$, $J=[j_1, j_2, \ldots, j_l]$, and $I_r$ is the first reported event in the sequence I (all events are classified as "reported" events or "unreported" events and this data is provided to the algorithm), and $J_r$ the first reported event in the sequence J. The partial order distance metric is calculated as follows:

If $I_r=J_r$, Distance=1, else: Distance=100.

D. Constructing A Configuration of Points

As explained above, the visualization engine 16 constructs a configuration of the points 24 in the target metric space based on the distance values 28 (FIG. 2, block 30). In this process, the visualization engine 16 translates the distance values 28 between pairs of the points 24 into a global structure in the target metric space, where the Euclidean distances between points in the global structure reflects the dissimilarities between pairs of points. In this way, similar sequences are represented by points that are grouped closer together and unrelated sequences are represented by points that are spaced farther apart.

Figure 4:
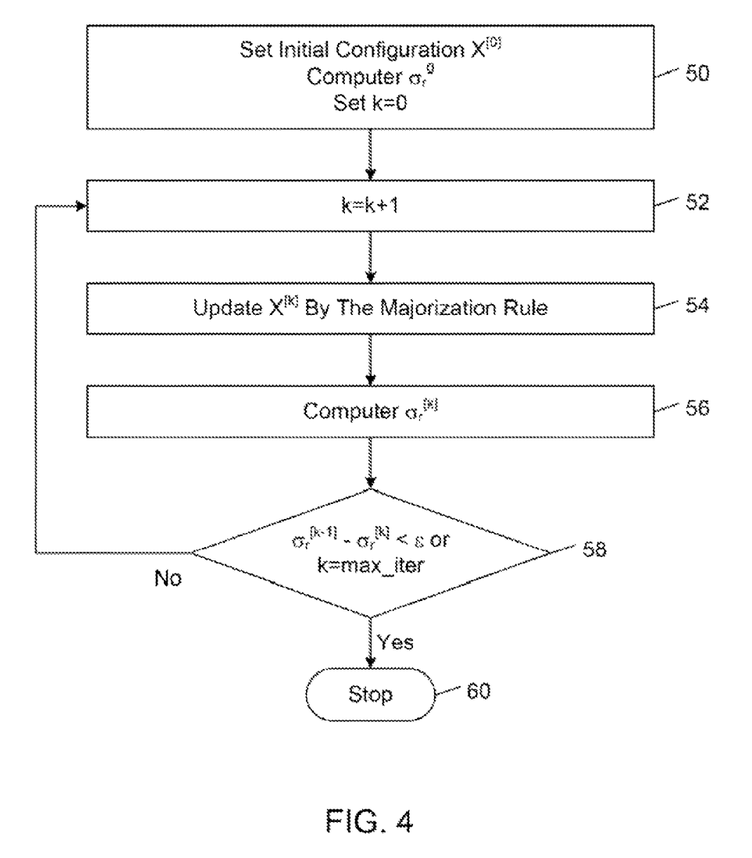
FIG. 4 is a flow diagram of an embodiment of a multidimensional scaling method of determining a configuration of points in a target metric space.

FIG. 4 shows an embodiment of a method by which the visualization engine 16 constructs a configuration of the points 24 in the target metric space. In accordance with this embodiment, the visualization engine 16 sets an initial configuration $X^{[0]}$, computes the stress function $\sigma_r^{[0]}$ for the configuration $X^{[0]}$, and sets the indexing parameter k=0 (FIG. 4, block 50). The visualization engine 16 increments the indexing parameter (FIG. 4, block 52). The visualization engine 16 updates the current configuration $X^{[k]}$ using the majorization rule (FIG. 4, block 54). The visualization engine 16 computes the current stress function $\sigma_r^{[k]}$ (FIG. 4, block 56). The process (FIG. 4, blocks 52-56) is repeated until the difference between the current and preceding stress function values (i.e., $\sigma_r^{[k-1]} - \sigma_r^{[k]}$) is less than a threshold value ($\epsilon$) or k reaches an iteration threshold (max_iter) (FIG. 4, blocks 58, 60).

A configuration $X^k$ is a matrix of size N×p, where N is the number of points, and p is the dimensionality of the target metric space. In the illustrated embodiment, p=2 (i.e., X and Y coordinate for each point). The stress function is defined as follows:

$$\sigma(X) = \sum_{i<j} w_{ij}(d_{ij}(X) - \delta_{ij})^2$$

where $w_{ij}$ is the weight assigned to the distance between the pair of points i and j, $d_{ij}(X)$ is the Euclidean distance between the points i and j in the configuration X, and $\delta_{ij}$ is the given or ideal distance between points i and j (given as input to the algorithm). The values of the weights $w_{ij}$ are parameter values that are input into the visualization engine 16 and $\delta_{ij}$ are the distance values computed by the distance calculator 14. In some embodiments, the values of the weights $w_{ij}$ reflect the confidence in the calculated distance between the points i and j.

The stress function $\sigma(X)$ is used to evaluate different configurations of points X. The configuration that minimizes the stress function $\sigma(X)$ yields a plot of the points in which points that are close together correspond to similar sequences. In some embodiments, the initial configuration $X^{[0]}$ is calculated for N points in a two-dimensional target metric space as follows, where distances are an N×N distance matrix between each pair of points:

$$J = I^{N \times N} - 1^{N \times N}/N;$$

$$B = -0.5 * J * distances.^2 * J;$$

$$[QL] = eigs(B, 2, 'LM');$$

$$z(:,1) = sqrt(L(1,1)).*Q(:,1);$$

$$z(:,2) = sqrt(L(2,2)).*Q(:,2);$$

where $I^{N \times N}$ is the identity matrix of size N×N. $1^{N \times N}$ is a matrix that contains all ones and has a size N×N, and M.^2 is the matrix/vector M in which each element is squared. In the end of this process Q will hold the two eigenvectors of the matrix B that correspond to the 2 largest eigenvalues, which are stored in L. The matrix z holds the calculated configuration (i.e., X and Y coordinate of each of the N points).

A variety of different methods may be used to determine the configuration that minimizes the stress function $\sigma(X)$, including but not limited to the iterative steepest descent method and the iterative majorization method. The iterative majoization method is used in the illustrated embodiment. In this embodiment, the update of the configuration $X^{[k]}$ according to majorization rule is done as follows:

$$\Rightarrow X^k = V^+ B(X^{k-1}) X^{k-1},$$

$$V = -W, \text{ only that } V_{ii} = \sum_{j \neq i} W_{ij}.$$

$$V^+ = (V + 11')^{-1} - n^{-2} 11'$$

$$b_{ij}(Z) = \begin{cases} -\dfrac{w_{ij} \delta_{ij}}{d_{ij}(Z)} & i \neq j, d_{ij} \neq 0 \\ 0 & i \neq j, d_{ij} = 0 \\ -\sum_{j=1, j \neq i}^{n} b_{ij} & i = j \end{cases}$$

where X[k−1] is the known configuration in iteration (k−1), W is the weight matrix of size N×N, and V+ is the Moore-Penrose pseudoinverse of the matrix V.

E. Presenting a Visual Representation of the Configuration

As explained above, a visual representation of the configuration is presented on a display 34 based on the output 32 generated by the visualization engine 16 (FIG. 2, block 36).

Figure 5:
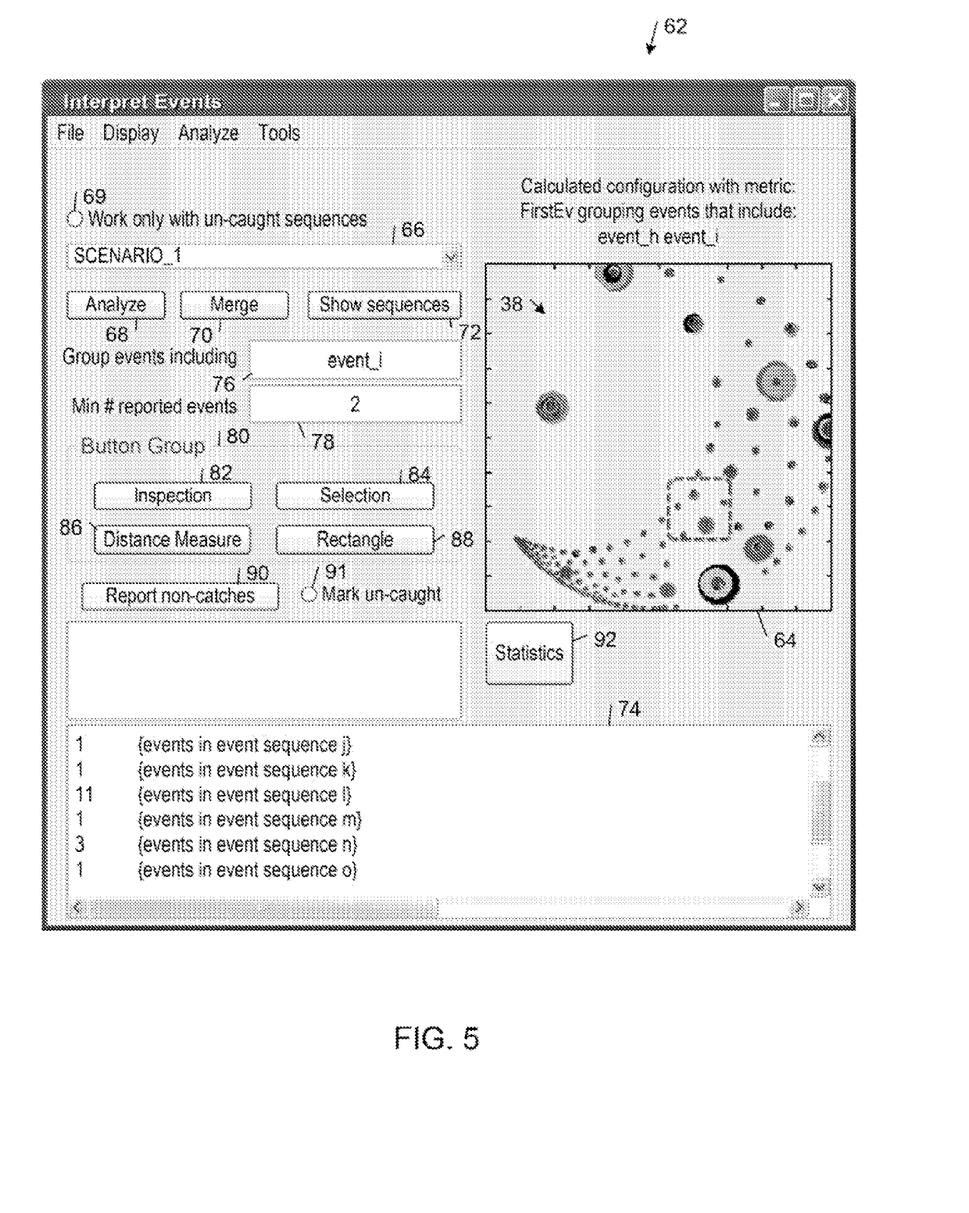
FIG. 5 is a diagrammatic view of an embodiment of a graphical user interface for the event analysis system of FIG. 1.

FIG. 5 is a diagrammatic view of an embodiment of a graphical user interface 62 for the event analysis system 10 (see FIG. 1). In some embodiments, the event analysis system 10 operates on three input files: (1) EventGroups.txt, which is a text file that includes sequences that were detected on the host computer system; (2) EventList.txt, which is a text file that includes all the possible event with the following information: ID, Name, Category, Urgency, and Service; and (3) ReportedEvents.txt, which is a text file that includes the list of all reported events). The input files can be changed by selecting the File menu button and the Define Input Files option in the File menu. This option allows the user to define the directory and the names of the three input files. The user may select the distance metric used in determining the configuration by selecting the File menu button and the Distance option in the File menu. This option allows the user to choose one of the possible distance metrics. The user can have the configuration recalculated by selecting the File menu button, selecting the Initialize option in the File menu, and selecting the Load files and recalculate option in the Initialize menu. This option will load the three text files, calculate distance matrix according to the selected distance metric, determine a configuration according to the calculated distances, and display the configuration in the visualization window 64.

A "Work only with un-caught sequences" radio button 69 is useful when a rule designer already has defined one or more filtering rules (described below) and now wants to see only the sequences that were not caught by any of the merged sequence templates so that merged sequence templates that capture these uncaught events can be defined. Selection of the "Work only with un-caught sequences" radio button 69 eliminates from the visualization window 64 all the event sequences that are captured by the current set of filtering rules. The resulting (smaller) set of uncaught event sequences typically makes it easier to define additional filtering rules.

The graphical user interface 62 includes a visualization window 64. The visualization window 64 shows a graphical depiction 38 of the configuration of points. In the illustrated embodiment, each circle represents a sequence of events. The size and color of the circles represent the number of times the corresponding sequence occurred. The bigger the circle, the more time the sequence occurred. In the image 38, the relative spacing between the points reflects the levels of dissimilarity between the points. Thus, the points corresponding to similar event sequences are spaced closer to one another and the points corresponding dissimilar event sequences are spaced farther apart from one another. The sequences may be examined, for example, by moving a computer mouse pointer over the circles shown in the visualization window 64. The sequences corresponding to the circles selected by the mouse pointer are presented in the list box 74, where the number that precedes each sequence describes the number of times the sequence occurred in the current dataset. Such visualization allows users to easily spot frequently occurring scenarios and enables them to easily segregate important events from unimportant events for a given scenario. In this way, these embodiments give users insights into event data that they can use to define rules that filter out events.

The graphical user interface 62 also includes a dropdown list box 66, an "Analyze" button 68, a "Merge" button 70, and a "Show sequences" button 72.

The dropdown list box 66 contains all the events available in the current event analysis project or scenario. The events typically are listed in alphabetic order. The dropdown list 66 allows the user to choose an event, and see, for example, where the sequences that include the selected event are located in the configuration shown in the visualization window 64.

The Analyze button 68 can be selected by the user to cause the event analysis system 10 to show a report concerning the event selected in the drop-down list 66. The report includes all sequences that include the selected event as their first reported event, compared to all sequences that include the selected event in any position other than the first reported event.

The Merge button 70 can be selected by the user to cause the event analysis system 10 to merge selected event sequences in accordance with a pairwise event alignment method that retains the important events that appear in all the sequences, and drops the sporadic events. In response to user selection of the Merge button 70, the event analysis system 10 merges all the selected sequences (e.g., sequences selected using the Show sequences button 72, drawing a rectangle that encompasses points in the visualization window 64, and using the Selection button 84) and opens a merge report that presents the results of the merging operation. In some embodiments, the merge report shows either the sequences and the results of the unordered merge only or a more thorough report that also includes the ordered merge results. In some embodiments, the type of merge report can be selected by opening a context menu (e.g., by clicking the right button of a computer mouse) and choosing one of "Simple Merge" and "Full Merge" in the context menu list. The merge report typically is presented in a separate graphical user interface shown in FIG. 6 (described below).

The Show sequences button 72 can be selected by the user to cause the event analysis system 10 to highlight all the circles in the configuration shown in the visualization window 64 that represent sequences that include the event selected in the in the drop-down list 66. The highlighted sequenced constitute a current working set of sequences that will be used to generate one or more merged sequence templates.

The graphical user interface 62 additionally includes a "Group events including" text box 76 and a "Min # reported events" text box 78. When a user enters a value to the field "Group events including" text box 76, all events that include this string in their name are considered as one event. This functionality can be used, for example, to distinguish between JAM event (paper stuck) and the other event by grouping all events that includes 'PCN_JAM' in their description. The value entered into the text box 78 controls the sequences that will be displayed (from all the sequences extracted from the database). In particular, only sequences with the required minimum number of reported events will be displayed (these sequence typically should be filtered with one or more filtering rules because the more reported events that are in a sequence the more it tends disturb the operator during operation).

The graphical user interface 62 also includes a Button Group 80 that includes an "Inspection" button 82, a "Selection" button 84, a "Distance Measure" button 86, and a "Rectangle" button 88. The Inspection button 82 can be selected by the user to enable the user view selected ones of the sequences (e.g., when the user moves a pointer over a circle presented in the visualization window or the user clicks on such a circle, the represented sequence is displayed in the list box 74, where the numbers in the left column are the numbers of different occurrences of the sequences extracted from the database, The Selection button 84 allows the user to select a set of sequences by clicking on circles in the configuration shown in the visualization window 64. The Distance Measure button 86 can be selected by the user to cause the event analysis system 10 to present the distance between two sequences selected by the user. In some embodiments, after clicking Distance Measure button 86 the user is prompted to click on two circles (representing two sequences) on the presented configuration, and the distances between the corresponding sequences is presented). The Rectangle button 88 allows the user to define a rectangle on the configuration presented in the visualization window 64, which causes the event analysis system to select all the sequences encompassed by the rectangle and present the selected sequences in the list box 74.

A "Report non-catches" button 90 can be selected by the user to cause the event analysis system 10 to show a report with all the sequences that are not caught by any of the currently defined filtering rules. This allows a rule designer to look at sequences that have not been addressed so far and to design filtering rules for these uncaught event sequences. User selection of the "Mark un-caught sequences" radio button 91 highlights all circles in the configuration shown in the visualization window 64 that represent sequences that are not caught by any of the defined filtering rules. This feature shows the rule designer where these sequences are located in the presented configuration; from this view the rule designer can determine a starting point for designing one or more filtering rules that capture these sequences.

Selection of a "Statistics" button 92 causes the event analysis system 10 to show basic statistic information about the selected sequences (e.g., how many sequences are there with one reported event, with two reported events, et cetera).

Selection of the "Work only with un-caught sequences" radio button 94 allows the user to limit the set of analyzed sequences to only those sequences that are not caught by any filtering rule (defined below). Then, the user may repeat the analysis (e.g., distance calculation according to one of the distance metrics, point configuration computation, etc) on the reduced set of event sequences. This allows the user to work with a smaller set of sequences after each merged sequence template definition, where different metrics and heuristics can be used to analyze events at each iteration.

F. Merging Sequences and Generating Event Filtering Rules

As explained above, user selection of the Merge button 70 can be selected by the user to cause the event analysis system 10 to merge event sequences in accordance with a pairwise event alignment method that retains important events drops the sporadic events.

Figure 6:
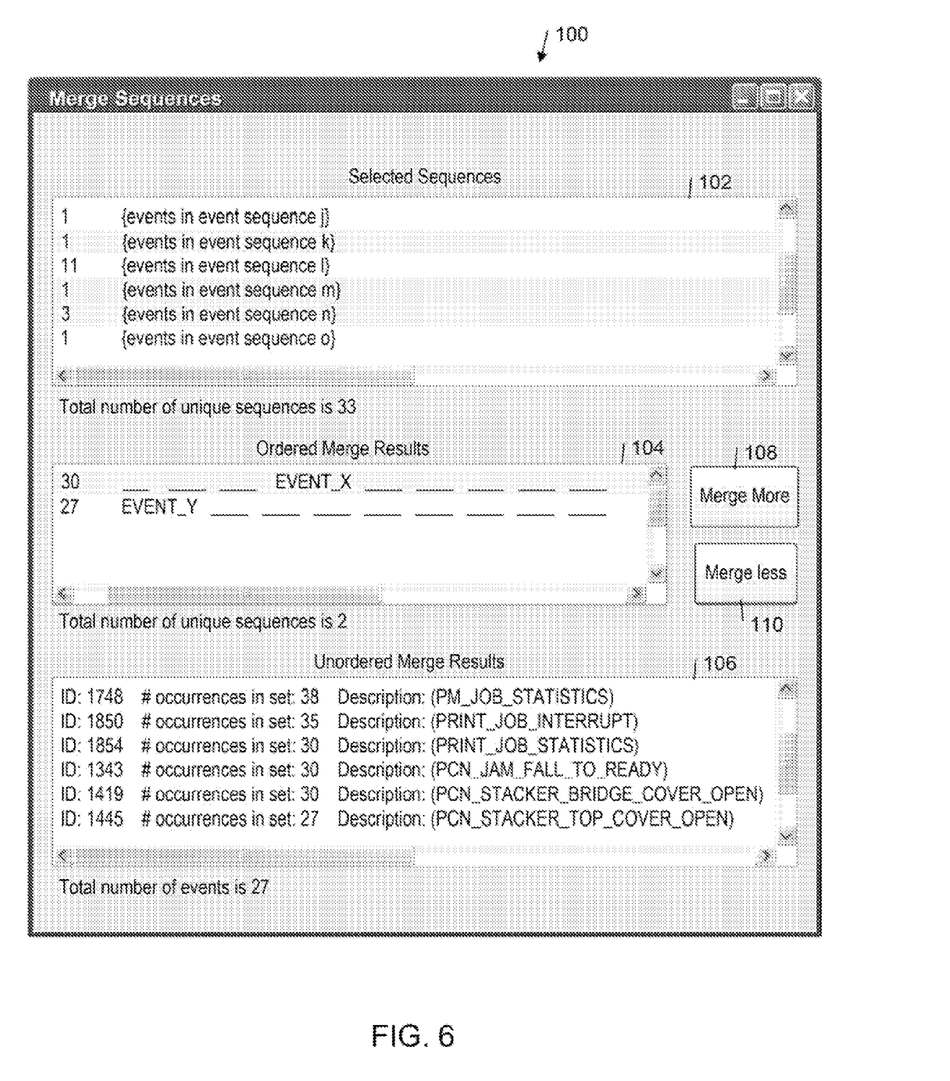
FIG. 6 is a diagrammatic view of an embodiment of a graphical user interface showing the results of merging a set of sequences for the event analysis system of FIG. 1.

FIG. 6 shows an embodiment of a graphical user interface 100 that presents the merge results and enables the user to modify the merging process. The graphical user interface 100 provides a merge report with the following three sections: a Selected Sequences section 102, and Ordered Merge Results section 104, and an Unordered Merge Results section 106.

The Selected Sequences section 102 lists all the event sequences that have been extracted from the database, where the left column of the list contains the numbers of different occurrences of the sequences in the database.

The Ordered Merge Results section 104 contains the rules that take into account the order of the events in the sequences. The user may change the current level of merging by selecting a Merge More button 108 and a Merge Less button 110. The merge results are presented in the form of "merged sequence templates." A merged sequence template includes events and "spaces" and defines a relative ordering of the events. The spaces represent one event or zero events. For example, a possible merged sequence template is the following: _X_Y_. This merged sequence template captures all sequences that include event Y after event X and all sequences that include event Y after an event that comes after X. Before X or after Y may be one event. In another example if the selected event sequences are:

1. ABC
2. ADC
3. AFC
4. CJK

Than the list of sequences window will show those sequences, and the list of rules will show:

1. A_C
2. CJK

In this example, the first three sequences are caught by rule 1 and the forth sequence is caught by merged sequence template 2. The rule designer can see the connection between the sequences and the rules by selecting one line (a sequences or a rule), and the corresponding lines in the list box 102 will be marked.

The Merge More button 108 and the Merge Less button 110 allow the user to modify the merged sequence template so that it encompasses a substantial fraction of the event sequences without being over inclusive. In response to user selection of the Merge More button 108, the event analysis system 10 generalizes the current merged sequence template (e.g., by dropping one of the events X and Y in the exemplary merged sequence template described above) according to a heuristic. In response to user selection of the Merge Less button 110, the event analysis system 10 makes the current rule more specific (e.g., by adding one or more conditions to the current merged sequence template).

The Unordered Merge Results section 106 lists all the events in the event sequences and their respective occurrence frequencies. Each of the sequences is treated as a set of events, without any importance to the order of the events. In the Unordered Merge Results section 106, each event is listed separately along with the number of sequences that include the event. The events typically are presented in order of the number of occurrences of the events, where the most frequent event (i.e., the event that appears in most of the sequences) typically is presented first.

The event analysis system 10 shows cross references between the sections 102-106. For example, in response to user selection of a sequence in the Selected Sequences section 102, the merge result that refers to the selected sequence is highlighted in the Ordered Merge Results section 104 and all the events in the selected sequence are highlighted in the Unordered Merge Results section 106. Also, in response to user selection of a merged sequence template in the Ordered Merge Results section 104, all sequences in the Selected Sequences section 102 that obey the selected merged sequence template are highlighted. In addition, in response to user selection of an event in the Unordered Merge Results section 106, all sequences that include this event are highlighted in the Selected Sequences section 102.

A rule designer can use the graphical user interface 62 in order to compute merged sequence templates automatically by marking a set of sequences in the graphical user interface 62 and clicking on the Merge button 70 (see FIG. 5). The rule designer then can analyze or modify the merged sequence templates presented in the Ordered Merge Results section 104 of the graphical user interface 100 (see FIG. 6). Based on this analysis, the rule designer can determine a suitable event filtering rule for a given set of sequences. A filtering rule has an antecedent and a consequence, where the antecedent is a merged sequence and the consequence is an event. In the illustrated embodiments, when the merged sequence matches the antecedent, the event filtering system replaces the matching sequences with the consequence. The rule designer can use the merged sequence template to define an event filtering rule that catches sequences which reflect a similar problem. For example, based on the exemplary merged sequence template described above, the rule designer may define a final event filtering rule as follows: "all sequences that include event Y after event X should result in an event filter output of event Z."

Figure 7:
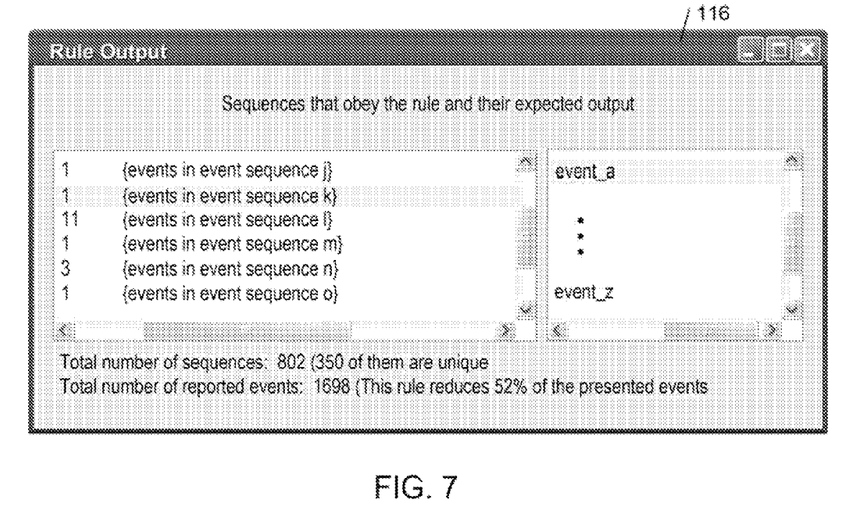
FIG. 7 is a diagrammatic view of an embodiment of a report showing the results of applying filtering rules generated by an embodiment of the event analysis system of FIG. 1.

The event analysis system enables the user to validate each event filtering rule against the whole database in order to verify that it catches all relevant sequences and does not catch other sequences. FIG. 7 shows an embodiment of a rule-results report 116 that shows a list of the sequences and events in the database that obey a selected event filtering rule.

In some embodiments, the event filtering rules are encoded as XML files, which may be written manually or using a rule-generation tool. The encoded rules then may be loaded into a target system. The target system converts the encoded rules into finite state machines (FSMs). The finite state machines implement business logic that listens to event streams generated by the target system, suppresses the presentation of ones of the events that are captured by an event generation component of the event filtering rules, and outputs descriptive data and recovery information relevant to the physical phenomenon that triggered the generation of the event stream. In some embodiments, the event filtering system receives one event at a time and handles that event. Using domain-specific sequence definitions, the event filtering system determines when events include a relevant sequence. Events that are not part of a defined sequence are passed through to a user interface that reports the evens to the user. Events that are part of a defined sequence are given to the finite state machines that implement the event filtering rules. When the system finds the end of a sequence, it sends a terminate sequence event to the finite state machines. At that time, if any finite state machine responds to the sequences its output will be sent to the user interface, rather than the original sequence of events. Depending on the event filtering rules and the input event streams, the finite state machines may respond to an input event sequence by taking no action, outputting one or more of the original events from the event stream, or outputting descriptive data and recovery information relevant to the physical phenomenon corresponding to the event sequence.

III. Exemplary Event Analysis System Architecture

Embodiments of the event analysis system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the event analysis system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the event analysis system 10 may be implemented in any one of a wide variety of electronic devices, including desktop computers, workstation computers, and server computers.

Figure 8:
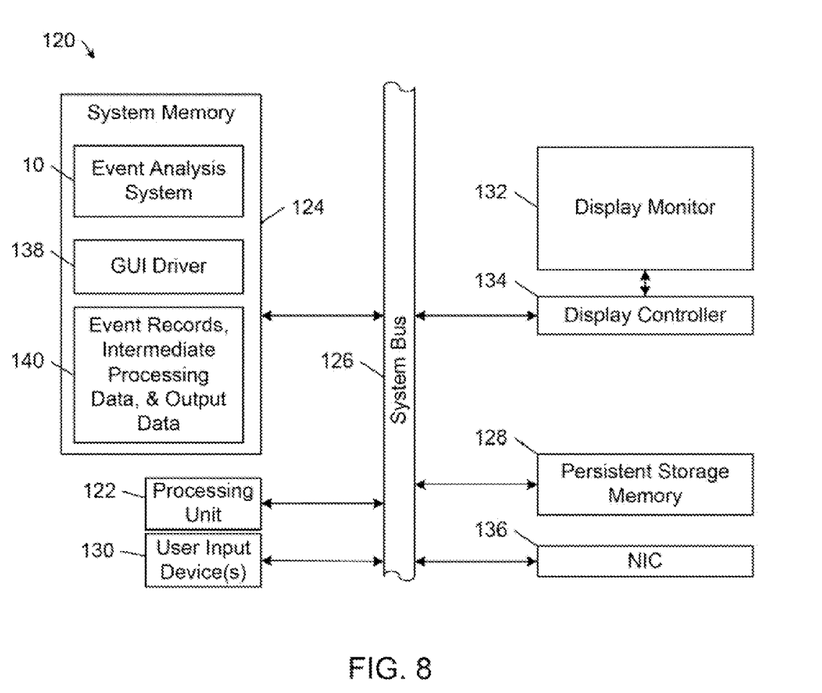
FIG. 8 is a block diagram of an embodiment of a computer implementing an embodiment of the event analysis system of FIG. 1.

FIG. 8 shows an embodiment of a computer system 120 that can implement any of the embodiments of the event analysis system 10 that are described herein. The computer system 120 includes a processing unit 122 (CPU), a system memory 124, and a system bus 126 that couples processing unit 122 to the various components of the computer system 120. The processing unit 122 typically includes one or more processors, each of which may be in the form of any one of various commercially available processors. The system memory 124 typically includes a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., enter commands or data) with the computer 120 using one or more input devices 130 (e.g., a keyboard, a computer mouse, a microphone, joystick, and touch pad). Information may be presented through a graphical user interface (GUI) that is displayed to the user on a display monitor 132, which is controlled by a display controller 134. The computer system 120 also typically includes peripheral output devices, such as speakers and a printer. One or more remote computers may be connected to the computer system 120 through a network interface card (NIC) 136.

As shown in FIG. 8, the system memory 124 also stores the event analysis system 10, a GUI driver 138, and at least one database 140 containing input data, processing data, and output data. In some embodiments, the compositional balance and color driven content retrieval system 10 interfaces with the GUI driver 138 and the user input 130 to present a user interface for managing and controlling the operation of the event analysis system 10.

IV. Conclusion

The embodiments that are described herein provide event analysis systems and methods that enable domain experts and other users to analyze event streams and develop event filtering rules. As explained in detail above, some embodiments discover significant sequences of events within an event stream and provide tools for visualizing, analyzing, and generalizing the discovered sequences. The visualization tools enable users to easily spot frequently occurring scenarios and segregate important events in a given scenario from unimportant ones. In this way, these embodiments give users insights into event data that they can use to define rules that filter out events. Some embodiments provide tools for distilling event streams into event filtering rules and tools for validating those event filtering rules.

Other embodiments are within the scope of the claims.

The invention claimed is:

1. An event analysis method, comprising:
identifying sequences of one or more events based on event records (20) describing the events;
determining respective distance values representing distances between ones of the sequences, wherein the determining comprises determining a respective distance value for each of one or more pairs of the sequences based on comparisons between constituent events of the respective sequences of the pair;
constructing a configuration of points in a target metric space based on the distance values, wherein each of the points represents a respective one of the sequences; and
presenting a visual representation of the configuration on a display.

2. The method of claim 1, wherein the identifying comprises identifying the event sequences based on one or more sequence definitions, wherein each of the sequence definitions comprises at least one condition defining a beginning of an event sequence and at least one condition defining an ending of an event sequence.

3. The method of claim 1, wherein the determining comprises ascertaining respective distances between pairs of the sequences based on a distance metric.

4. The method of claim 3, wherein the ascertaining comprises determining the distances based on variable weight values that are assigned to respective ones of the events.

5. An event analysis method, comprising:
identifying sequences of one or more events based on even records (20) describing the events;
determining respective distance values representing distances between ones of the sequences;
constructing a configuration of points in a target metric space used on the distance values, wherein each of the points represents a respective one of the sequences;
presenting a visual representation of the configuration on a display; and
presenting on the display a graphical user interface enabling a user to perform operations on ones of the event sequences.

6. The method of claim 5, further comprising merging ones of the event sequences in response to user input received through the graphical user interface.

7. The method of claim 6, wherein the merging comprises identifying events that are shared in common among the event sequences, and further comprising presenting the identified events in the graphical user interface in a format that identifies a respective ordering of the identified events.

8. The method of claim 7, further comprising displaying in the graphical user interface list of events satisfying the respective ordering of the identified events.

9. The method of claim 5, wherein the identifying comprises parsing a stream of event records, identifying a set of event sequences based on the parsing, and selecting one or more of the event sequences in the identified set based on user input received through the graphical user interface.

10. The method of claim 5, further comprising presenting one or more user-selectable distance metrics in the graphical user interface, and wherein the determining comprises ascertaining respective distances between pairs of the sequences based on a user-selected selected one of the distance metrics.

11. The method of claim 5, further comprising receiving a user designation of an event filtering rule, applying the designated event filtering rule against a set of event sequences, and presenting on the display ones of the event sequences that meet the designated event filtering rule and ones of the event sequences in the set that fail to meet the designated event filtering rule.

12. An event analysis system, comprising:
a computer-readable memory storing computer-readable instructions; and
a data processing unit coupled to the memory, operable to execute the instructions, and based at least in part on the execution of the instructions operable to perform operations comprising
identifying sequences of one or more events based on event records describing the events,
determining respective distance values representing distances between ones of the sequences, wherein the determining comprises determining a respective distance value for each of one or more pairs of the sequences based on comparisons between constituent events of the respective sequences of the pair,
constructing a configuration of points in a target metric space based on the distance values, wherein each of the points represents a respective one of the sequences, and
presenting a visual representation of the configuration on a display.

13. The system of claim 12, wherein based on the execution of the instructions the data processing unit is operable to perform operations comprising presenting on the display a graphical user interface comprising an interface enabling a user to perform on ones of the event sequences operations comprising at least one of: selecting one of multiple distance metrics used in the determining; merging ones of the sequences; and applying a designated event filtering rule against a set of event sequences and presenting on the display ones of the event sequences that meet the designated event filtering rule and ones of the event sequences in the set that fail to meet the designated event filtering rule.

14. A non-transitory computer-readable medium storing computer-readable instructions which, when executed by a computer, cause the computer to perform operations comprising:
identifying sequences of one or more events based on event records describing the events;
determining respective distance values representing distances between ones of the sequences, wherein the determining comprises determining a respective distance value for each of one or more pairs of the sequences based on comparisons between constituent events of the respective sequences of the pair;
constructing a configuration of points in a target metric space based on the distance values, wherein each of the points represents a respective one of the sequences; and
presenting a visual representation of the configuration on a display.

15. The non-transitory computer-readable medium of claim 14, wherein when executed by the computer the computer-readable instructions cause the computer to perform operations comprising presenting on the display a graphical user interface comprising an interface enabling a user to perform on ones of the event sequences operations comprising at least one of: selecting one of multiple distance metrics used in the determining; merging ones of the sequences; and applying a designated event filtering rule against a set of event sequences presenting on the display (34) ones of the event sequences that meet the designated event filtering rule and ones of the event sequences in the set that fail to meet the designated event filtering rule.

\* \* \* \* \*

UNITED STATES PATENT AND TRADEMARK OFFICE
CERTIFICATE OF CORRECTION

PATENT NO. : 8,655,800 B2  Page 1 of 1
APPLICATION NO. : 13/123095
DATED : February 18, 2014
INVENTOR(S) : Ruth Bergman et al.

It is certified that error appears in the above-identified patent and that said Letters Patent is hereby corrected as shown below:

In the Claims:

In column 14, line 40, in Claim 5, delete "even" and insert -- event --, therefor.

In column 14, line 45, in Claim 5, delete "used" and insert -- based --, therefor.

In column 14, line 61, in Claim 8, delete "list" and insert -- a list --, therefor.

In column 16, line 34, in Claim 15, delete "sequences" and insert -- sequences and --, therefor.

Signed and Sealed this
Third Day of June, 2014

Michelle K. Lee
*Deputy Director of the United States Patent and Trademark Office*